United States Patent [19]

Nagaoka

[11] Patent Number: 4,718,334

[45] Date of Patent: Jan. 12, 1988

[54] APPARATUS FOR REMOVING STEM AND ROOT OF BULB

[75] Inventor: Tatsuo Nagaoka, Yokohama, Japan

[73] Assignee: Nagaokaseiki Seisakusho Co., Ltd., Kanagawa, Japan

[21] Appl. No.: 875,316

[22] Filed: Jun. 17, 1986

Related U.S. Application Data

[63] Continuation-in-part of Ser. No. 709,201, Mar. 7, 1985, abandoned.

[30] Foreign Application Priority Data

Mar. 8, 1984 [JP] Japan ................................ 59-42892

[51] Int. Cl.$^4$ ...................... A23N 15/02; A23N 15/04
[52] U.S. Cl. ........................................ 99/636; 99/546; 99/643
[58] Field of Search .............. 99/636, 637, 643, 546, 99/549, 550; 83/251, 418, 420, 421; 198/345, 384, 468.2

[56] References Cited

U.S. PATENT DOCUMENTS

| | | | |
|---|---|---|---|
| 3,186,459 | 6/1965 | Van Raay | 99/636 |
| 3,373,786 | 3/1968 | Andersen et al. | 99/549 X |
| 3,765,320 | 10/1973 | Van Raay | 99/636 |
| 4,006,677 | 2/1977 | Vadas | 99/549 |
| 4,090,439 | 5/1978 | Chall et al. | 99/549 X |

Primary Examiner—Timothy F. Simone
Attorney, Agent, or Firm—Lowe, Price, Leblanc, Becker & Shur

[57] ABSTRACT

An apparatus for cutting and removing stems and roots of bulbs includes a carrying element for the bulb, a centering element, cutting elements for the stem and the root, and a holding element to hold the bulb. The central position, between an upper cutter and a lower cutter arranged in said cutting element, and the similar central position between the upper portion and the lower portion of the bulb are both arranged to be on a reference line located at a predetermined height above a base reference such as a floor. The holding part of the holding element is moved from the centering element to the cutting element, for cutting of the stem and the root thereby, along the base line while said holding part is holding the bulb.

5 Claims, 13 Drawing Figures

APPARATUS FOR REMOVING STEM AND ROOT OF BULB

FIELD OF THE INVENTION

This application is a continuation-in-part of application Ser. No. 709,201 filed Mar. 7, 1985, abnd.

The present invention relates to an apparatus for cutting and removing the useless stem and root of a bulb such as an onion, garlic, and shallot.

PRIOR ART

In general, a bulb such as an onion is widely used as a cooking material. However, in fine cutting of the bulb, it is necessary to peel the bulb after cutting off its root. Consequently, to perform these procedures on a large number of the bulbs, it is necessary to utilize mechanical measures.

However, when both of the stem and root of the bulb are to be simultaneously cut at a time, if the cutters for cutting the stem and the root are fixed in position since the onions vary in size and configuration, the cutting operation results in unsatisfactory cutting, i.e., excessive or insufficient cutting. Excessive cutting causes loss of a useful portion of the bulb, while insufficient cutting requires supplemental cutting and loss of productivity.

To resolve the above-mentioned problem, a cutting unit for cutting the stem and the root of the onion has been proposed in Japanese Patent Publication No. 45780/1977, in which a cutting unit is provided a supporting/guiding member operable up and down, which supports the onions individually, and is moved into and away from a cutting operation area by means of a taking in-and-off mechanism which is also provided in the cutting unit; a clamping mechanism for clamping the onion in a vertical direction in the supporting/guiding member is so provided that it may be synchronized with at least the supporting/guiding member in the cutting operation area to be moved from a moved-into side to a moved away side of the cutting operation area; and a cutter is provided in a certain position opposite to each of the upper and lower ends of the onion so that the cutter changes its phase in a direction in which the onion is moved so as to cut each of the stem and the root of the onion. However, since, in the above conventional cutting unit, the root positioned at a lower side of the onion is first cut and then the stem positioned at an upper side of the onion is cut, such a conventional cutting unit is cumbersome in its operation. Further, in such a conventional cutting unit, since the onion is moved by the clamping mechanism after the root thereof is cut, to make it possible to position the stem of the onion, it is complicated.

U.S. Pat. No. 3,765,320 (Van Raay Oct. 16, 1973), discloses a removing unit for the stem and root of the bulb. This removing unit has, in combination, a conveyor belt provided supporting holes for the bulb, a cutting unit which clamps the conveyor belt and is arranged in upper and lower position of the belt, and a detecting unit which detects the size of the bulb. The above-mentioned removing unit adjusts the upper and lower positions of the cutting unit according to the size of the bulb and then removes the stem and the root thereof.

The above-mentioned removing unit detects the size of the bulb without any carrying movement from the supporting hole, cuts the stem and the root of the bulb, and carries out the bulb on the supporting hole for the bulb. In this unit, the cutting condition of the removing unit causes the bulb to be unstable.

U.S. Pat. No. 3,186,459 (van Raay June 1, 1965), discloses a removing unit for the stem and the root of the bulb. The removing unit comprises, in combination, a conveyor which carries the bulb, a pair of cutting units which hold the conveyor and is arranged up and down, and a rotating edge which is fixed at constant intervals from a cage with a footplate which which forms the cutting unit supported elastically so as to move freely up and down.

The above-mentioned removing unit is considered to hold the bulb firmly in cutting its stem and root. However, the bulb still remains on the conveyor after removing the stem and the root and it needs much time and special devices to go to the next manufactuing process from the conveyor.

Other prior art, is disclosed in U.S. Pat. Nos. 3,373,786 (Mar. 19, 1968), 3,620,274 (Nov. 16, 1971), 4,006,677 (Feb. 8, 1977), and 4,090,439 (Mar. 23, 1978), teaching apparatuses for carrying, clamping, and adjusting the positions of fruits.

These examples are somewhat relevant of the present invention with respect to carrying and clamping of the bulb; however, these are all apparatuses for removing kernels or cores of fruits.

SUMMARY OF THE INVENTION

It is an object of the present invention to provide an apparatus for cutting the stem and the root of a bulb, which is able to adjust the central positions of bulbs at an appointed point and is able to cut stems and roots of the individual bulbs to a predetermined extent, in spite of the variations of their size and shape.

It is a further object of the present invention to provide firm holding, reliable cutting, easy movement to the next maunfacturing process, and high speed operation for cutting of the stems and roots off bulbs.

In order to achieve the above objects, the present invention comprises a carrying element for the bulb, a centering element, a cutting element for the stem and the root, and a holding element, whereby the central position in the upper and lower direction of the bulb fixed by the centering element and the central position between the upper and the lower cutters in the cutting element are both arranged in correspondence with a base line selected to be at an appointed height from a fixed reference such as a stand or a floor, and a holding part of the holding element is moved from the centering element to the cutting element along the base line while the bulb is held by the holding parts.

DETAILED DESCRIPTION OF THE INVENTION

The present invention is described in detail with reference to the drawings, in the following.

Figure 1:
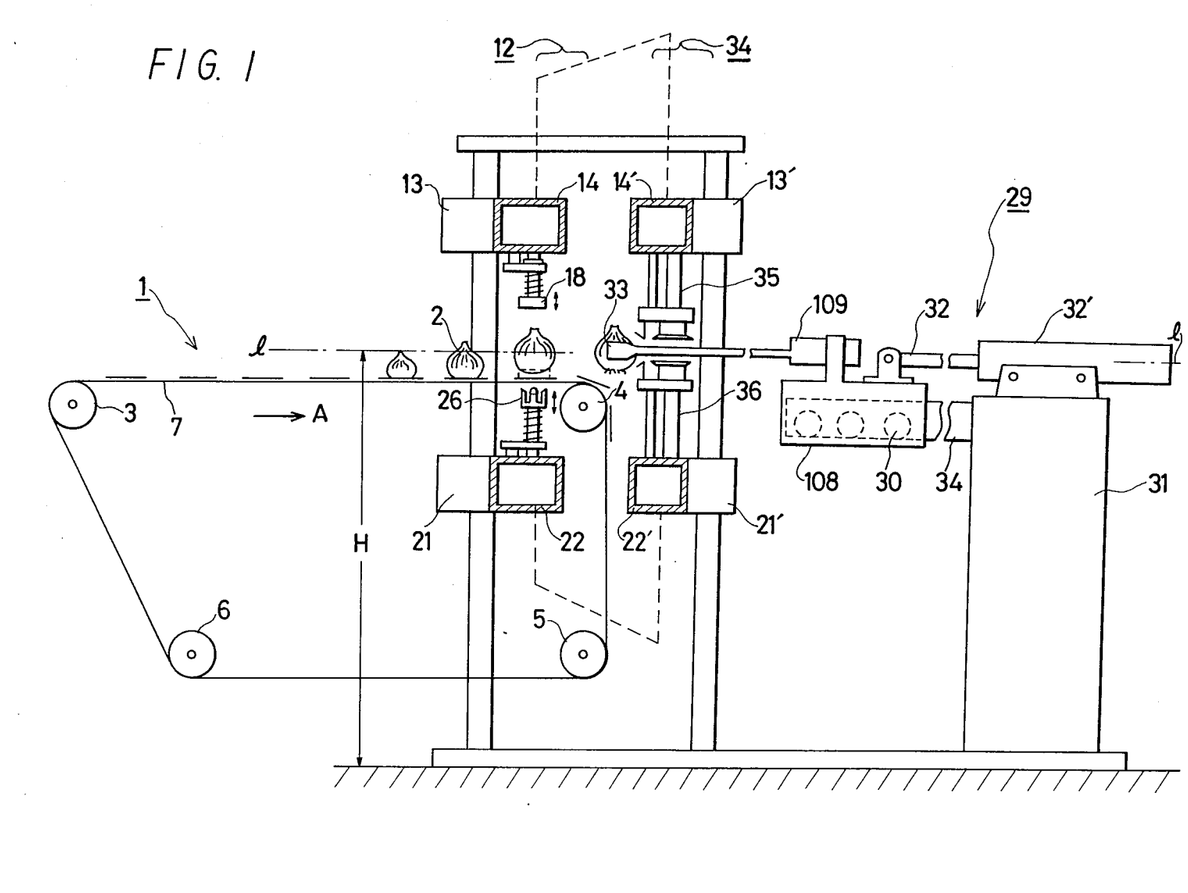
FIG. 1 is a brief side view a preferred embodiment of the apparatus for cutting and removing the stem and the bulb.

In FIG. 1, the reference numeral 1 designates a carrying element for an onion 2, and a chain conveyor 7 is extended around sprockets 3,4,5, and 6. The main conveyor 7 comprises two parallel chains 8,9 and supporting/guiding members 11, like plates, provided with plural supporting holes 10 for mounting onions so that stems 2a are upward and roots 2b are downward, arranged at even intervals on the chains 8,9 as shown FIG. 2 and FIG. 3.

Figure 4:
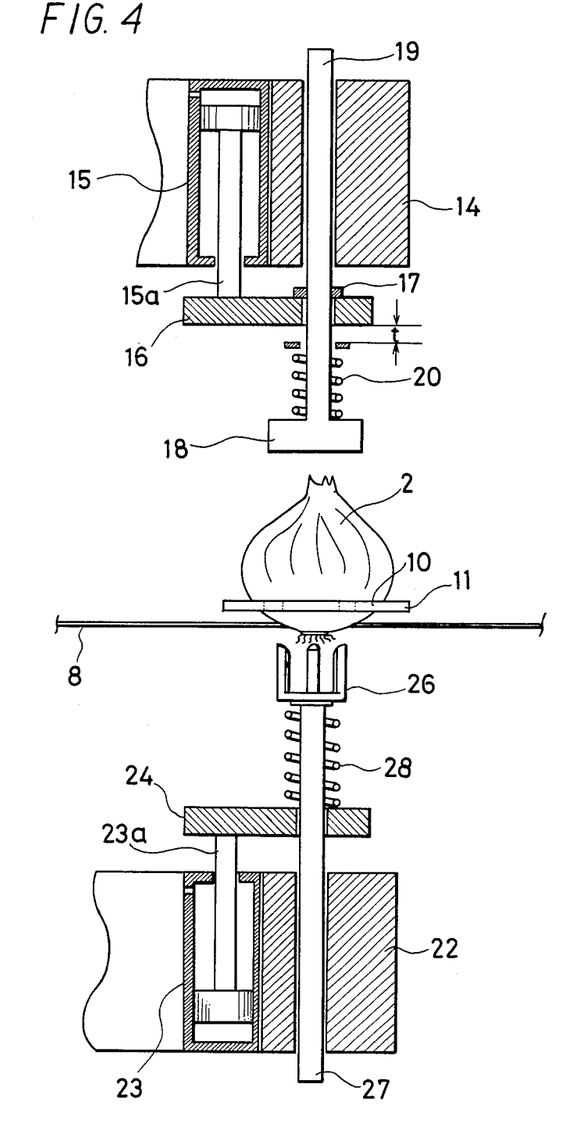
FIG. 4 is a partial side view showing a centering element.
Figure 5:
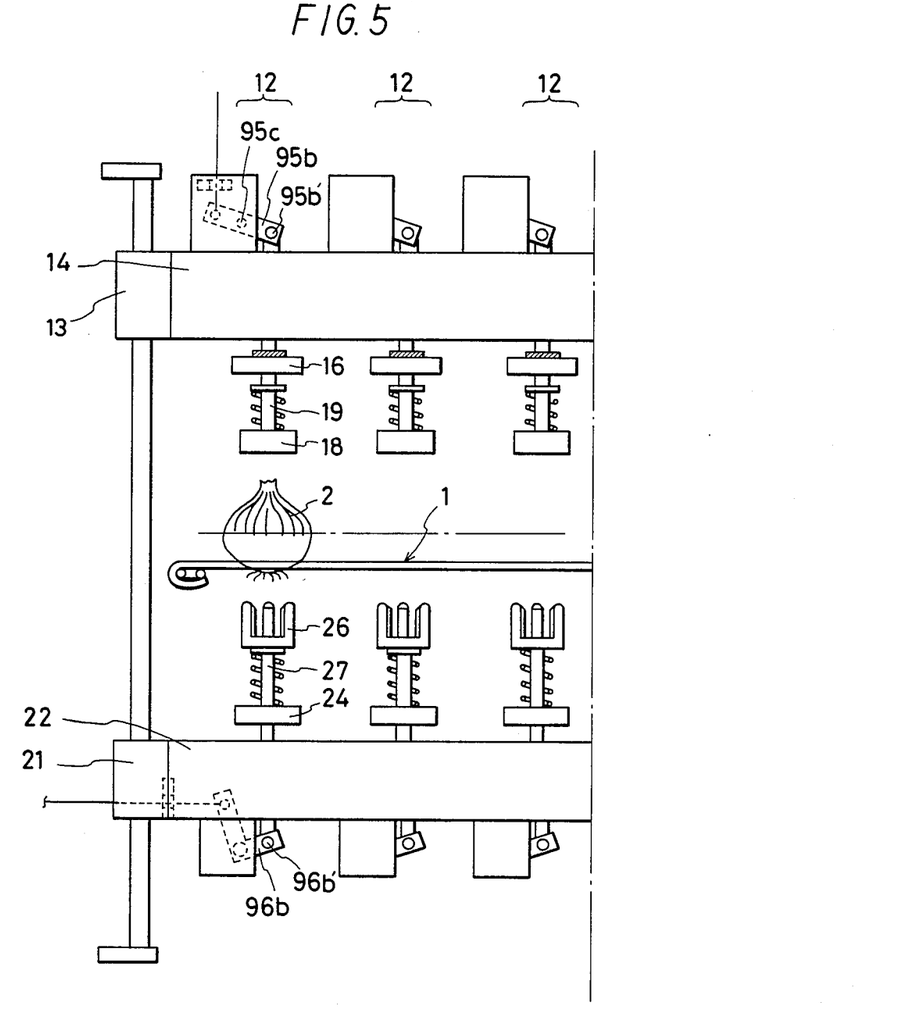
FIG. 5 is a front view showing a centering element.

The reference numeral 12, FIGS. 4 and 5, designates a centering element which comprises in combination, an upper supporting portion 13, a fixing article 14, first air cylinder 15, an upper moving element 16, and a lower supporting portion 21.

The upper supporting portion 13 is formed at the upper end of the centering element 12 and the fixing article 14 is arranged at the top end of the upper supporting portion 13. The first air cylinder 15, which has the piston rod 15a below, is arranged at the top end of the fixing article 14. The upper moving element 16 is arranged at the top end of the piston rod 15a of the first air cylinder 15 (FIG. 4). The fixing article 14 is a bar which crosses over the carrying element 1 between the left and the right upper supporting portions 13.

The upper supporting portion 13 and the lower supporting portion 21, described below, are inserted into guide supports of a frame which forms a figure of an open box. The upper supporting portion is fixed so as to move freely. A holding rod 19 comprising an upper clamping element 18 which is slidable up and down is fixed at the lower end of the upper moving element 16. A first spring 20 is mounted on the holding rod 19 and the upper clamping element 18. The reference numeral 17 designates a stopper ring fixed at the holding rod 19. The holding rod is inserted into the guide holes of the moving element 16 and the fixing article 14 so as to be slidable. Consequently, the lower position of the slidable clamping element 18 is decided by the stopper ring 17. When the clamping element 18 is slidable as shown in FIG. 4, the spring 20 mounted on the holding rod 19 keeps an interval between the top end of the spring and that of the clamping element 18 which is the upper moving element at the same time.

The reference numeral 21 designates a lower supporting portion fixedly mounted on a substantially central portion of a side of the machine frame 12 and extends parallel to the upper supporting portion 13. In a front end thereof, lower supporting portion 21 is provided a second air cylinder 23 for moving a piston rod 23a upward. The front end of the piston rod 23a of the second air cylinder 23 is integrally provided a lower moving element 24. Fixing element 22 is a bar which crosses over the carrying element 1 between the left and the right of the lower supporting portion 21.

Figure 2:
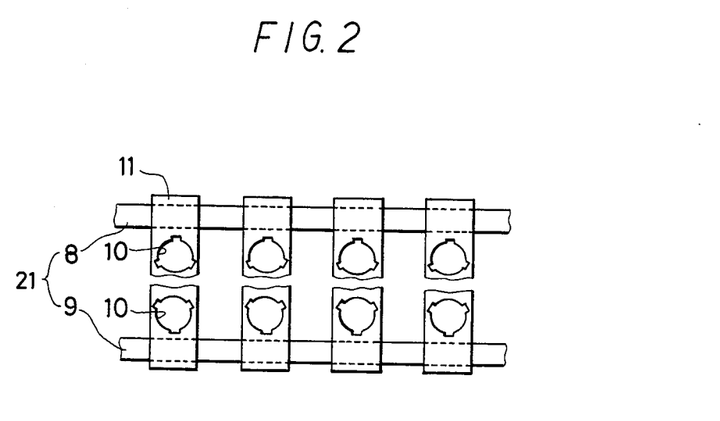
FIG. 2 is a side view showing the main portion of a carrying element shown in FIG. 1.
Figure 3:
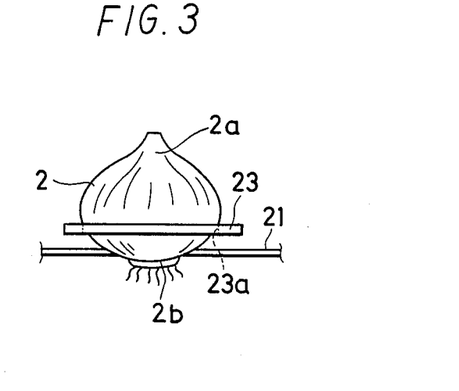
FIG. 3 is a plan view showing the main portion of a carrying element shown in FIG. 1.

The lower moving element 24 is provided with a holding rod 27 which is slidably supported and has a lower clamping element 26. A second spring 28 is mounted on the holding rod 27 attached to the lower clamping element 26 holding the onion 2. The lower clamping element 26 is inserted into the supporting hole 10 of the supporting/guiding members, pushes up the onion 2, and clamps an onion 2, regardless of its size, with the upper clamping element 18 at the appointed central position. No stopper ring is fixed at the lower holding rod 27, unlike the upper holding rod 19, so there is no interval associated with the second spring 28. The lower clamping element is three pronged to provided the desired stability in supporting the bottom of the bulb, and corresponding to the prongs (like pointed nails), the through-holes for the prongs are formed around the circle at even intervals, as shown in FIG. 2, which illustrates the supporting holes 10 of the supporting/guiding members 11.

A number of units of the centering elements 12 are arranged in parallel on the width of the carrying element 1, as shown in FIG. 5. The carrying element 1 is common to these centering elements.

Figures 6, 7:
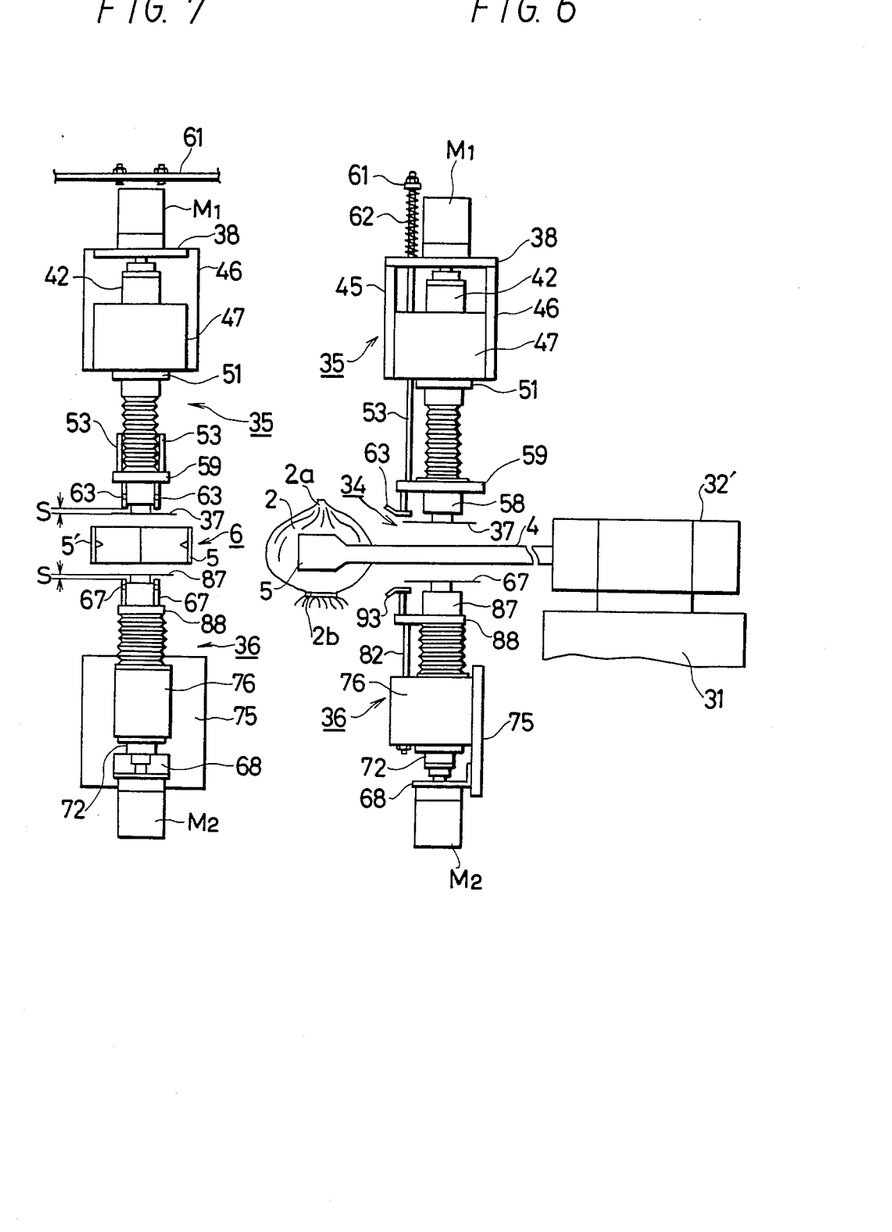
FIG. 6 is a side view showing a portion of a cutting element and a holding element.
FIG. 7 is a front view showing a portion of a cutting element and a holding element shown in FIG. 6.

In FIG. 6 and FIG. 7, the reference numeral 34 designates a cutting elements for the stem 2a and the root 2b of the onion 2, comprising an upper cutting unit 35 for the stem and an lower cutting unit 36 for the root. As shown in FIG. 6, a first motor M1 which rotates a cutter 37 for the stem 2a of the onion 2, is arranged on a plate 38 which fixes the motor so that the cutting phase is horizontally fixed. A contacting hand 40 for the motor is fixed at a shaft 39 (FIG. 8) of the first motor M1 by a key 41. An upper end of a hallow shaft 42 on the same axis as the motor shaft 39 is mounted by bolts. A spline shaft 43 on the same axis as the motor shaft 39 is integrally fixed in the hollow shaft 42 by bolts. Plate 38 for fixing the motor is fixed on the upper end of the upper sliding plates 45,46.

The reference numeral 47 designates an upper supporting body fixed below between the upper sliding plate 45 and 46, wherein the empty shaft 42 is fixed so as to be rotated freely with radial ball bearings 48 and 49. Radial ball bearings 48 and 49 are covered with an upper cover 50 and lower cover 51 which are fixed up and down of the upper supporting body 47. The reference numeral 52 designates through-holes which are plurally formed through the guide rod 53 in the same axis as the spline shaft 43 in the upper supporting body 47.

The spline shaft 43 is connected with the spline connector 44 so as to be slidable up and down on the same axis as the motor shaft 39. A boss 55 for fixing an edge of the cutter 37 for the stem of a bulb is fixed at the lower end of the spline shaft 43 with a shaft 54. A stopping ring 56 for preventing the cutter 37 from falling down is fixed at the upper end of the spline shaft so as to permit movement up and down about the cutter 37 for the stem of the bulb. A shaft 54 is fixed on an upper bearing 58 so as to be rotatable with bearings 57,57 and is integrally mounted in a guide plate 59 supported by the upper portion of the upper bearing 58. The lower end of a long guide rod 53 is fixed in the guide plate 59 with nuts in the same direction as the vertical spline shaft 43.

The central portion of the guide rod 53 is inserted into the through-hole 38a of the plate 38 for fixing the motor and the through-hole 52 of the upper supporting body 47. The upper end of guide rod 53 is fixed by a nut 60 and is supported by a supporting plate 61 for the guide rod. Around the guide rod 53 between the supporting plate 61 for the guide rod and the plate 38 for fixing the motor, a compressed spring coil 62 the cutter 37 for the stem is to serve as a means for resetting and is adjusted by the nut 60.

The reference numeral 64 designates a bushing fixed in the through-hole 52 of the upper supporting body 47. The reference numeral 65 designates a seat fixed by a bolt on the upper portion of the fixing plate 59 for a guide. The reference numeral 66 designates a boot, made of elastic material such as rubber, fixed around the spline shaft 43 between the lower cover 51 and the seat 65. The boot 66 expands and contracts up and down and protects the spline shaft 43 from accretion thereon of chips of the cut onions.

In addition, a roller bearing is provided to move freely in the direction of the shaft for the sake of guiding the upper supporting body 47 and the guide rod 53 with little friction.

A lower cutting element 36 for the root is fixed symmetrically with the cutting element 35 for the stem with respect to the horizontal axis which runs through the center of the onion 2. The motor M2 which rotates a cutter 67 for cutting the root 2b of the onion 2 is fixed in the lower face of a fixing plate 68. A connecting hand 70 for the motor M2 is fixed at a motor shaft 69 of the second motor N2 using a key 71. A spline connector 74 which connects the cutting element 35, the spline shaft 43 and a spline shaft 73 in the central axis of the spline shaft 43 is integrally fixed in the hollow shaft 72 by a bolt. The fixing plate 68 for the motor is fixed in the lower side of a lower sliding plate 75.

The reference numeral 76 (FIG. 9) designates a lower supporting body which is fixed in the side portion of the lower sliding plate 75, wherein the hollow shaft 72 is supported so as to be rotated freely in radial ball bearings 77,78. The radial ball bearings 77,78 are held by an upper cover 79 and a lower cover 80 fixed in upper and lower positions of the lower supporting body 76 by bolts. The reference numeral 81 designates a through-hole into which is inserted a guide rod 82 formed at the upper supporting body 75 parallel to spline shaft 73.

The spline shaft 73 is in coaxial with the motor shaft 69 and is fixed at spline connector 74 so as to be slidable up and down. A connecting ring 83 for preventing from falling down thereof is fixed at the lower end of the spline shaft 73 and a fixing boss 85 for an edge of the cutter 67 for the root is fixed to the shaft 54.

The cutter 67 for the root is able to move up and down freely. A shaft 84 is fixed at a lower bearing 87 so as to be rotated freely with bearings 86,86'. The lower portion of the shaft 84 is embodied with a guide plate 88 whose lower portion is the supporting portion. The upper end of the long guide rod 82 is fixed in the vertical direction of guide plate 88. The portion below the center of guide rod 82 is inserted into the through-hole 81 of the lower supporter 76 and the lower end of the guide rod 82 is fixed with a nut 89.

The reference numeral 90 (FIG. 9) designates a compressed spring coil which is a means for resetting cutter 67 for the root set around the spline shaft 73 between a seat 91 fixed at the upper cover 79 and the lower phase of the guide plate 88, and the nut 89 adjusts the compressed spring coil 90. Boat 92, made of elastic material such as rubber, is arranged around the compressed spring coil 90 and can expand and contract as needed.

Figure 12:
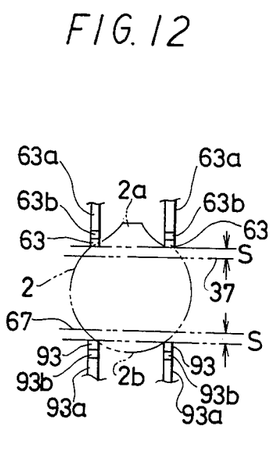
FIG. 12 and FIG. 13 are front views showing the function of a leading parts.
Figure 13:
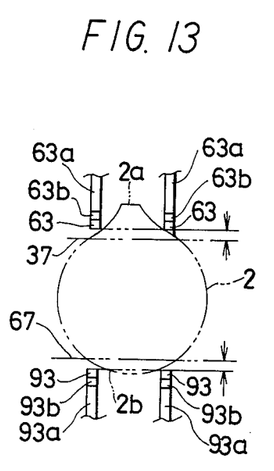

The reference numeral 93 designates two parallel leading parts and attached to the upper face of the guide plate 88 by a supporting rod 93a. A guide portion 93b, having a downwardly sloping portion is formed at the top end of each leading part 93. A slit S having a constant width is formed between the upper leading parts 93 and the cutter 67 for the root. (See FIGS. 12, 13) Bush 94 is in the through-hole 81 of the lower supporting body 76.

Thus, the cutter 37 for the stem and the cutter 67 for the root are respectively movable up and down, and are biased toward each other by the compressed spring coils 62,90, respectively.

The cutting element 35 for the stem and the cutting element 36 for the root are respectively supported so as to be slidable by the upper sliding plate 46 and the lower sliding plate 75 at a fixing part 14' of the upper supporter 13'.

An interlocking device which coordinates the lower and upper levels, respectively, of the lower clamping element and the upper clamping element to the lower and upper cutting elements 36,35 is explained below.

As shown in FIG. 5, a rotatable part 95b for detecting movement in the axis of the upper clamping element 18 is held so as to rotate freely about a shaft 95c. This rotating part 95b is arranged so as to bring the outer end of the holding rod 19 of the upper clampiing element 18 into contact with a contacting part 95b' fixed at one end of the rotating part 95b. A wire 100, for adjusting the position of the upper cutting element, is fixed at the other end of the rotating part 95b. Similarly, a bell crank 96b for detecting the movement in the axis of the lower clamping element 26 is fixed so as to rotate freely at the lower fixing element 22. A connector 96b' which is always touching the outer end of the holding rod 27 of the lower clamping element 26, is fixed on the one end of the bell crank 96b, and a wire 100' for adjusting the position of the lower cutting element is affixed to the other end of bell crank 96b.

Figure 8:
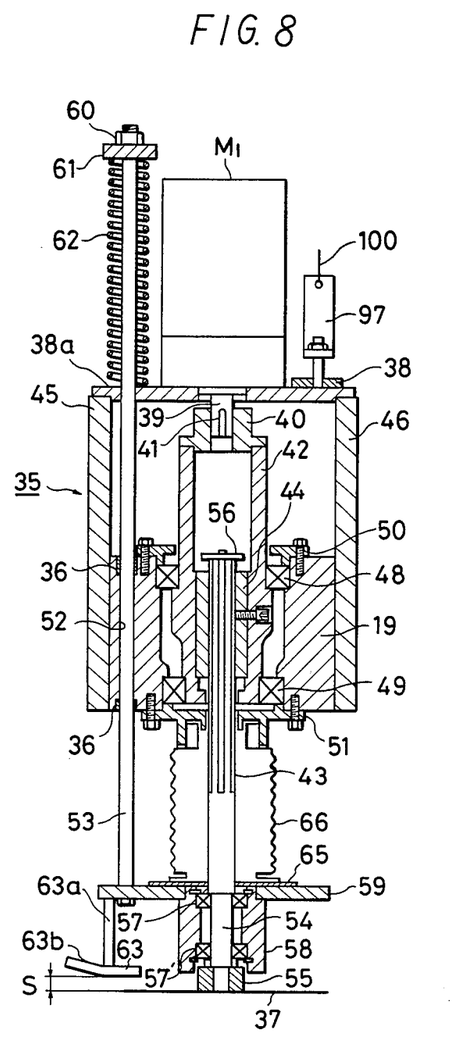
FIG. 8 is a side view showing a cross section of an upper cutting element.
Figure 9:
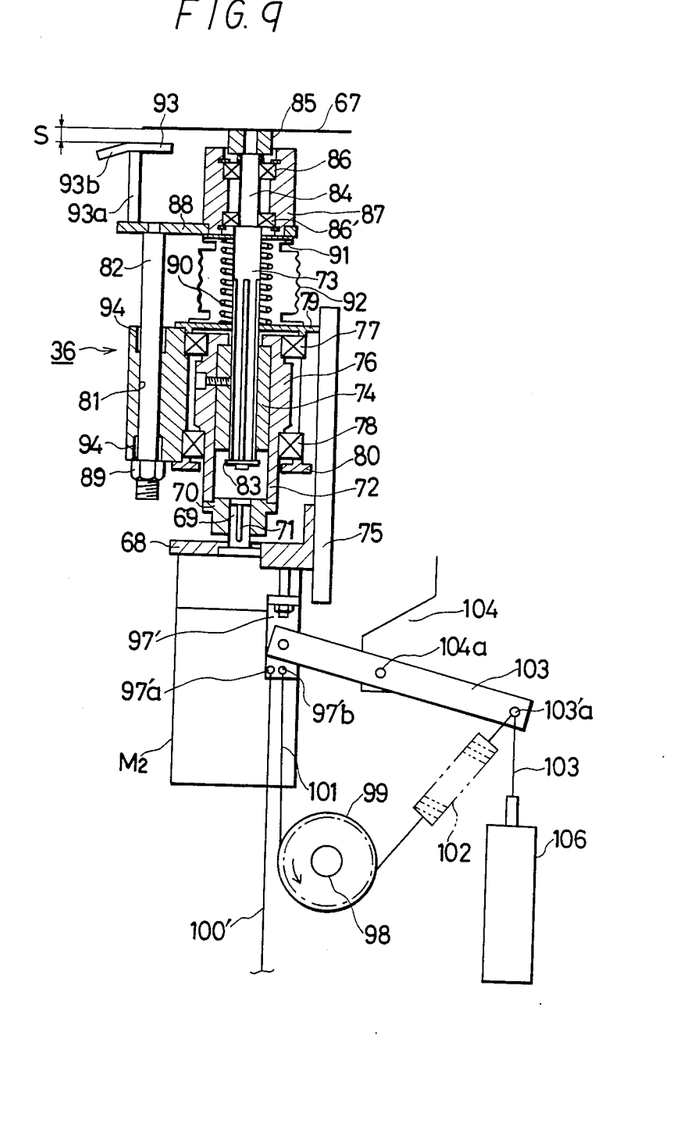
FIG. 9 is a side view showing a lower cutting element and a controlling element.

As shown in FIG. 8, a connecting plate 97 is fixed on the frame of the upper cutting element 35, and the another end of wire 100 is fixed at the end of the said connecting plate 97. On the other hand, as shown in FIG. 9, a connecting plate 97' is fixed on the lower cutting element 36 and an end of wire 100' is fixed at a hole 97'a. Another hole 97'b is in the connecting plate 97'. One end of a wire 101 rolled around a pulley 99 fixed at a shaft 98 with a rotatable crank in a single direction (as indicated in FIG. 8 by an arrow) is fixed at the hole 97'b, and another end of the wire 101 is fixed at a hole 103'a in the end of a rotating lever 103 with a spring 102. The rotating lever 103 is supported by a shaft 104a of a frame 104 affixed to the frame body. A weight 106 is hung by a wire 105 which is connected to a hole 103'a in the lever 103. All of the lower cutting element 36 is supported up by the rotating lever 103 which is given a torque to the clockwise direction.

Figure 10:
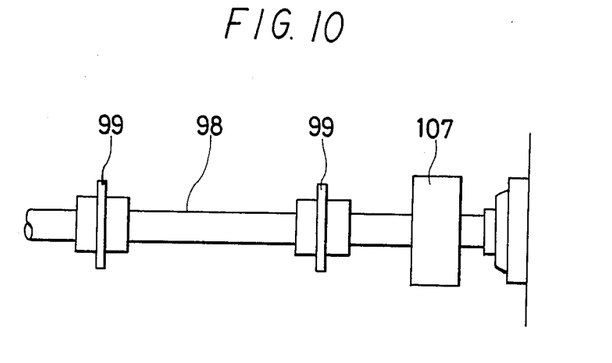
FIG. 10 is a front view showing the main portion of a controlling element.

As shown in FIG. 10, a controlling element 107 for stopping the rotation of the shaft 98 is fixed for fixing the cutting position during operation of the cutting elements 35,36. The controlling element 107 comprises, for example, a band brake the brake shoe of which is connected with an air cylinder 109 attached to a holding element 29 which is mentioned below, i.e., when air cylinder 109 is inoperative, the brake shoe is also, and the shaft 98 is rendered inoperative for separating onion 2 from the holding parts 33,33'. On the other hand, when the air cylinder 109 is operated to hold the onion 2, the brake shoe operates to stop rotating of the shaft 98 to fix the position of the cutter.

The construction of the controlling element 107 is similar to that of the upper cutting element 35, and a separate figure and detailed explanation therefore are omitted.

As shown in FIG. 1 and FIG. 6, reference numeral 29 designates a holding element for onion 2, an air cylinder 32' is arranged on stand 31, and a holding parts 33,33' for holding the onion 2 at both sides of the onion 2 are fixed at the top end of piston rod 32 which can move and return freely in the horizontal direction.

Holding element 29 comprises a frame 108 which is supported, to move and return freely, by a guide stand 34 with a roller 30. Air cylinder 32' and an air cylinder 109 which moves the holding parts 33,33' are fixed in the frame 35.

Figure 11:
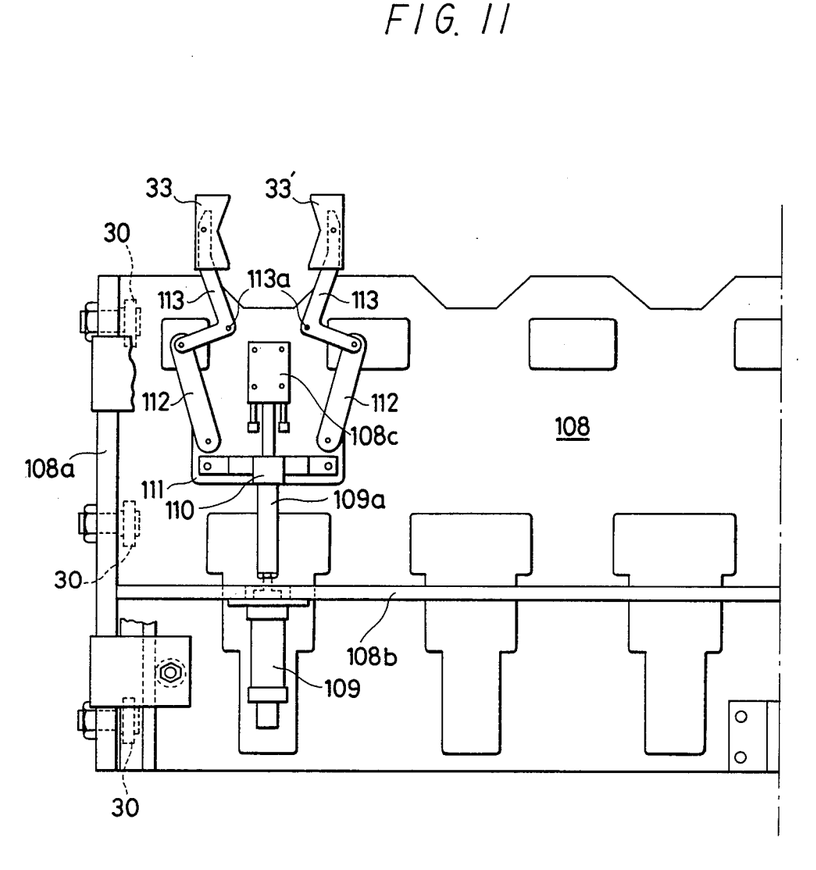
FIG. 11 is a plan view showing a unit of a holding element.

As best seen in FIG. 11, three rollers 30 are supported by a shaft so as to be rotated freely on each of side walls 108a of the frame 108. Six air cylinders, only one of them being shown in FIG. 11, are fixed on a crossing wall 108b. A piston rod 109a of the air cylinder 109 is supported so as to be freely slidable in an inner hole of a supporting part 108c with an outer end fixed on the frame 108'. Connecting and connecting element 110 is fixed in a body around the center of the supporting part 108c. The connecting element 110 is integrally connected to a bell crank link 113 with a connecting plate 111 and a link 112, and the holding parts 33,33' are supported so as to be rotated freely at the outer end of the link 113. According to the moving and returning movement of the piston rod 109a, a link 113 is rotated around the shaft 113a which is at the central point of the link 113 and fixed in the frame 108 with the link elements 110,111, and 112. The onion 2 is clamped or separated by approaching or separating of the holding parts 33,33'. Further, the stroke of the piston rod 32 is designed to be enough longer than the distance between the holding parts 18 and 26 of the the centering element 12 and the distance between cutters 37 and 67 of the cutting elements for the stem and the root.

As shown in FIG. 1, the central point between the upper cutter 37 and the lower cutter 67 fixed in the cutting element 34 for the stem and the root, and the central point between the upper and the lower portions of the onion 2 (which is adjusted its position by the centering element 12) are arranged to be on a reference line 1—1 which is at an appoinnted height from a reference such as the floor. The onion 2 is held by the holding parts 33,33' of the holding element 29 at the base line, and is moved from the centering element 12 for the stem and the root.

The operation of the present invention is explained in the following. First, sprocket 5 is rotated at intervals by a motive power (not shown), then the chain conveyor 7 is moved at intervals to the direction of an arrow A shown in FIG. 1, and the onion 2 which is put on the supporting/guiding member 11 integrated with the conveyor 7 is carried on the centering element 12 with the stem facing up and the root facing down. When onion 2 reaches the appointed position between the centering element 12 and the lower clamping elements 18,26, then the upper moving element 16 is moved down by the air cylinder 15 for the upper moving elemnt in FIG. 4. As the result, the upper clamping element 18 which is fixed in the upper moving element 16 comes in contact with the stem 2a of the onion 2.

Next, air cylinder 23 moves the lower moving element 24 up, then the lower clamping element 26 is moved through the supporting hole 10 of the supporting/guiding member 11 and the lower clamping element 26 is moved up and stopped after moving the appointed distance, pushing against the upper clamping element 18 which is already moved down. During this movement, the upper clamping element 18 is pushed up only by reason of the interval t in the beginning, afterwards the spring 20 is compressed after reaching of the upper end of the spring 20 to moving element 16. The spring can be contacted with the bulb from a non-loaded condition, so that the position of the bulb is accurately decided. When the movement of the lower clamping element is stopped, the central point of the onion 2 clamped by the upper clamping element 18 and the lower clamping element 26 locates at the base line 1—1 a position which corresponds to a balance between forces exerted by spring 20 and spring 28. In spite of the variation in the size or shape of the onion 2, the central position of the onion 2 is always exactly arranged at the height H, because the central position is decided mainly by the balance of forces between spring 20 and spring 28. Problems such as unstable holding, or falling down of the bulb, thus do not occur, and the carrying of the bulb is reliable.

According to the action of the above-mentioned centering element, the working position, i.e., the heights of the cutters 37,67 of the upper and lower cutting elements 35,36 are adjusted. The operation thereafter is explained in detail below. First, in the centering operation, the holding rods 19,27 of both the clamping elements are moved in opposite directions by compressing the springs 20, 28 and the wires 100, 100' for adjusting their end positions are pulled by the rotation of the rotating parts 95b and the bell crank 96b. Next, cutters 37,67 which are in a balanced position by action of a weight 106 connected to rotatable lever 103 are adjusted for height by moving with the cutting elements 35, 36. Then the pulley 99 is rotated around the shaft 98 with the rotating clutch (FIG. 9). As the size of the onion 2 becomes bigger, the amount of compression of the springs 20,28 also becomes larger. As a result, cutters 37,67 are automatically adjusted to provide a larger distance between the two cutters, corresponding to the larger size of the onion 2.

Next, by operation of the air cylinder 32' (FIG. 1) of the holding element 29, the frame 108 of the holding element 29 is moved to the side of the centering element 12 so as to arrange the holding parts 33,33' of the holding element 29 on both sides of the onion 2. By operating the air cylinder 109, the forward movement of the piston rod 109a is changed into an approaching movement for the holding parts 33,33' toward each other by the link structure, and thus the onion 2 is held by the holding parts 33,33'. By operating the air cylinder 32', piston rod 32 is actuated to keep onion 2 at the appointed height H and moves the onion 2 to the side of the frame 108 and the cutting element for the stem and the root. In the above-mentioned operation, the controlling element 107 (FIG. 10) stops the rotation of the shaft 98 holding the onion 2 at the same time. On the other hand, the reverse rotation of the pulley 99 is avoided by the unidirectional rotating clutch, and the position of the cutter is fixed as stated above.

According to the backward movement of the frame 108, the onion 2 is carried for the cutters 37, 67, in such a position that the stem is held out from the space between the leading parts 63b and 63b of the guide portion 63, and the root is held out from the space between the guide portions 93b and 93b of the leading parts 93.

The onion 2 is then cut by the cutters 37,67 which are rotated by the motors M1, M2. Then the onion is taken off from the clamping elements 18,26, the clamping elements 18,26 are reset in their starting position though the wires 100, 100' are relaxed, the position of the cutter is fixed and the pulley 99 is controlled. Thus, problems such as the position of the cutter being changed by colliding with the onion rarely occur even in at high speed operation and the accurate cutting removal of the stem and the root is possible at high speed. The upper and the lower portions of the onion 2 are contacted with the leading parts 63,93 and are moved a little by the onion 2. Next, cutters 37,63 are slightly adjusted up and down from the cutting position of the upper and the lower cutting elements 75,36, the positions of which are changed by the movement of the clamping elements 18,26, i.e., first a cutter is roughly adjusted by the connecting means, and next it is carefully adjusted again by the leading parts according to the size of the bulb, which means that accurate cutting and removing of the stem and the root of the bulb is realized lastly, the upper and the lower of the onion 2 are cut and removed. The cutters are positioned to operate at their standard positions, e.g., the position of the leading portions of cutters 37,67 are slightly adjusted up and down according to the movement of the clamping elements 18,26, using the leading parts 63,93, the guide plates 59,88, and the guide rod 53.

After the onion 2 which is cut at both ends, it is carried to a position such that onion 2 does not make contact with the cutters 37,67 while it is held. The onion 2 is then off from the clamping parts 33,33' by the off-working of the air cylinder 109, and is then carried to, for instance, a stripping element (not shown). On the other hand, as the controlling operation is stopped when the air cylinder 109 ceases operation in taking off the onion 2, the rotating shaft 98 is rotated freely and the cutters 37,67 are reset by the weight 106. The above-mentioned steps are repeatedly and periodically performed on all such occasions.

In the present invention, the carrying element, the centering element, the cutting elements for the stem and the root, and the holding element are arranged in accordance with a predetermined reference line. As the carrying of the bulb from the centering element to the cutting element can be obtained by movement in a straight line, high speed operation is possible using an air actuated machine that has a periodical movement e.g., cylinder and a piston connected to a piston rod.

The centering element and the cutting elements for the stem and the root are independently constructed and the holding element carries the bulb between the said elements. So it is easy in the present apparatus to carry the bulb to the next manufacturing process after cutting off of the stem and the root, as compared with prior art apparatus which holds the bulb and cuts the stem and the root of the bulb while the bulb is on the conveyor during the operation.

I claim:
1. Apparatus for cutting off and removing the stems and roots from bulbs, comprising:
   bulb carrying means for carrying said individual bulbs into position for said cutting of the stem and root portions therefrom;
   cutting means for cutting said stems and roots from said bulbs, said cutting means comprising a root cutting element separated from a stem cutting element;
   centering means for centering each of said bulbs individually, to a predetermined level between said root cutting element and said stem cutting element; and
   holding means for holding each of said centered bulbs individually as centered by said centering means, said holding means being movable to transport each said held bulb at said predetermined level from said centering means to said cutting means for cutting thereby of the root and stem of said held bulb.
2. Apparatus according to claim 1, wherein:
   said centering means comprises upper and lower spring-loaded coacting clamping elements that clamp said bulb therebetween, the position of the bulb so clamped being at said predetermined level.
3. Apparatus according to claim 2, wherein:
   said clamped position of said bulb between said upper and lower clamping elements is determined by springs provided therein for said spring-loading.
4. Apparatus according to claim 2, wherein:
   said lower clamping element is provided with a plurality of circularly arrayed and substantially vertical extensions for non-slip clamping of said bulb thereby.
5. Apparatus according to claim 1, wherein:
   said holding means is movable to transport said bulb, after the stem and root are cut off therefrom, from said cutting means to another location for further processing thereat of said thus trimmed bulb.

* * * * *